United States Patent Office 2,839,540
Patented June 17, 1958

2,839,540
1-AMINO-4-HYDROXYANTHRAQUINONE SULFONIC ACIDS AND A PROCESS FOR THEIR MANUFACTURE

Albin Peter, Binningen, and Erhard Wydler, Basel, Switzerland, assignors, by mesne assignments, to Saul & Co., Newark, N. J., as nominee of Fidelity Union Trust Company, executive trustee under Sandoz Trust No Drawing. Application September 13, 1954
Serial No. 455,754

Claims priority, application Switzerland
September 16, 1953

6 Claims. (Cl. 260—373)

This invention relates to 1-amino-4-hydroxyanthraquinone sulfonic acids and to the production thereof.

According to the present invention, it has been found that 1-amino-4-hydroxyanthraquinone sulfonic acids, which conform to the following general formula:

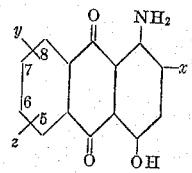

wherein $x$ represents a bromine atom or a sulfonic acid group, $y$ represents a hydrogen atom or a halogen atom in one of the positions 6 and 7, or a sulfonic acid group in one of the positions 5, 6, 7 and 8, and $z$ represents a hydrogen atom or a halogen atom in one of the positions 7 and 6 when $y$ represents a halogen atom, and represents a hydrogen atom when $y$ represents a sulfonic acid group, at least one of $x$, $y$ and $z$ representing a sulfonic acid group, may be obtained by heating the appropriate 1-amino-4-bromoanthraquinone sulfonic acid in sulfuric acid containing boric acid.

The process of the present invention is surprising since it is known that 1-amino-4-bromoanthraquinone-2-sulfonic acid readily loses a sufonic acid group, when heated with sulfuric acid, with shifting of the bromine atom into the 2-position.

The 1-amino-4-hydroxyanthraquinone sulfonic acids so obtained are new, with the exception of 1-amino-4-hydroxyanthraquinone-2-sulfonic acid.

Starting materials which may be used for producing 1-amino-4-hydroxyanthraquinone sulfonic acids are: 1-amino-4-bromoanthraquinone-2-sulfonic acid and derivatives thereof substituted by halogen in positions 6 and/or 7, such as 1-amino-4-bromo-6-chloroanthraquinone-2-sulfonic acid, 1-amino-4-bromo-6:7-dichloroanthraquinone-2-sulfonic acid, 1-amino-4-bromo-7-chloroanthraquinone-2-sulfonic acid, 1-amino-4-bromo-6- and -7-fluoroanthraquinone-2-sulfonic acids, 1-amino-4:6- and -4:7-dibromoanthraquinone-2-sulfonic acids and technical mixtures thereof; also 1-amino-2:4-dibromoanthraquinone-5-, -6-, -7- and -8-sulfonic acids and technical mixtures thereof. Sulfuric acid suitable for the reaction should be free from water, and with advantage should have a small content of free sulfur trioxide, e. g. up to about 10%. It is preferred to add at least one molecular proportion of boric acid. A lesser amount diminishes the speed of reaction, but excess may be added without effect. Reaction in general commences below 100° C., and the reaction speed may be accelerated by heating to a somewhat higher temperature such as 110–120° C. The reaction is normally complete within a few hours. Completion of the reaction may be determined by observing when the evolution of bromine ceases. The rate at which the reactants are consumed may also be observed by chromatographic analysis upon samples removed during the course of the reaction.

When reaction is complete, the reaction mass is poured into water or aqueous salt solution. The precipitate is filtered off and may be converted into its alkali metal salt in the usual way by neutralization.

The 1-amino-4-hydroxyanthraquinone sulfonic acids may be used as intermediates for the production of dyestuffs of the anthraquinone series. They may also themselves be used as dyestuffs, e. g. for dyeing wool. Some of the dyestuffs dye polyacrylonitrile fibers (e. g. Orlon) by the cuprous ion method in shades of good fastness to washing and to light.

The following examples illustrate the invention without limiting it in any way. The parts given are parts by weight, the percentages are percentages by weight, and the temperatures are in degrees centigrade.

EXAMPLE 1

10 parts of boric acid are dissolved in a mixture of 145 parts of sulfuric acid monohydrate and 38 parts of 27% fuming sulfuric acid, and there are then added 20 parts of the sodium salt of 1-amino-4-bromoanthraquinone-2-sulfonic acid. The mixture is heated to 120° C. and the bromine which is evolved is led off into an absorption apparatus by means of a stream of dry air. After some 6–10 hours the evolution of bromine has stopped. The solution is cooled to 20° C. and is poured with vigorous agitation into 500 parts of water. The precipitate is sucked off, is dissolved in 500 parts of hot water and is separated by filtration from a small residue of insoluble material. There is added to the filtrate 25 parts of sodium chloride, whereby the sodium salt of 1-amino-4-hydroxyanthraquinone-2-sulfonic acid which corresponds to the formula

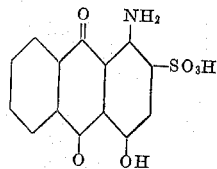

separates out. The product dissolves in sulfuric acid with a yellow coloration, which changes to blue upon the addition of paraformaldehyde. It dyes fibers of polyacrylonitrile in violet shades which are fast to washing and to light.

EXAMPLE 2

24 parts of boric acid are dissolved in 580 parts of sulfuric acid monohydrate and 150 parts of 27% fuming sulfuric acid, following which there are added 100 parts of the sodium salt of 1-amino-4-bromoanthraquinone-2:6-disulfonic acid. The mixture is heated at 120° C. until bromine ceases to be evolved, and the reaction mixture when cooled is poured into 2,000 parts of a 15% solution of sodium chloride. The precipitate is sucked off, is washed with a 20% solution of sodium chloride and is rendered neutral by kneading with dry sodium carbonate. After drying, there is obtained the sodium salt of 1-amino-4-hydroxyanthraquinone-2:6-disulfonic acid which corresponds to the formula

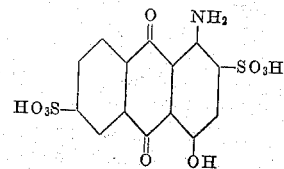

in the form of a dark violet powder. It dissolves in concentrated sulfuric acid with a greenish-yellow coloration which changes to blue upon the addition of paraformaldehyde. The dyestuff readily dissolves in water with a violet coloration. Wool may be dyed in pure shades of violet from an acid aqueous solution of the dyestuff, and the dyeings may be converted to greenish-blue by chroming. Dyeings upon polyacrylonitrile fibers are violet.

The sulfonic acid group in 2-position may be split off in alkaline solution by means of hydrosulfite, to give 1-amino-4-hydroxyanthraquinone-6-sulfonic acid which is not readily accessible otherwise. It corresponds to the formula

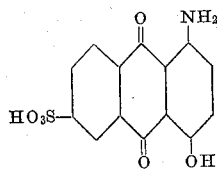

and gives in concentrated sulfuric acid solution an orange coloration which changes to reddish-blue upon the addition of paraformaldehyde.

EXAMPLE 3

26 parts of the sodium salt of 1-amino-4-bromo-6:7-dichloroanthraquinone-2-sulfonic acid are mixed with 184 parts of sulfuric acid monohydrate, and there are added to the mixture 3.5 parts of boric acid and 20 parts of 27% fuming sulfuric acid. The mixture is heated at 120–125° C. until evolution of bromine has ceased. The reaction mixture is cooled to 20° C. and is poured into 1500 parts of water. The precipitate which separates out is filtered off, and is rendered neutral by kneading with lithium carbonate. Upon drying, there is obtained the lithium salt of 1-amino-4-hydroxy-6:7-dichloroanthraquinone-2-sulfonic acid of the formula

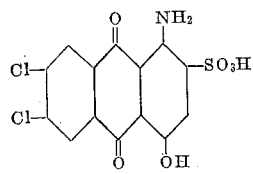

It is a dark violet powder which dissolves in concentrated sulfuric acid with a greenish-yellow coloration which changes to blue upon the addition of paraformaldehyde. The dyestuff dissolves in water with a bluish-violet coloration.

EXAMPLE 4

A mixture of 25 parts of the sodium salt of 1-amino-2:4-dibromoanthraquinone-6-sulfonic acid, 3.5 parts of boric acid, 150 parts of sulfuric acid monohydrate and 15 parts of 27% fuming sulfuric acid are heated with stirring at 115–125° C. until evolution of bromine has ceased. The cooled mixture is poured into 1000 parts of water. After adding 150 parts of sodium sulfate, the reaction product which separates out is filtered off by suction and is washed until neutral with a 5% solution of sodium sulfate. The product corresponds to the formula

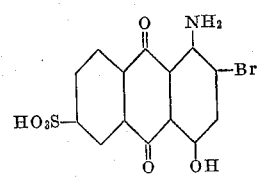

and is, when dry, a reddish-violet powder which dissolves in concentrated sulfuric acid with a yellow coloration changing to blue upon the addition of paraformaldehyde. The dyestuff dissolves in water with a reddish-violet coloration.

EXAMPLES 5–14

In the table which follows there are listed a number of 1-amino-4-hydroxyanthraquinone sulfonic acids prepared by a method as described in the foregoing examples, using the appropriate 1-amino-4-bromoanthraquinone sulfonic acid as starting material. The new 1-amino-4-hydroxyanthraquinone sulfonic acids are characterized by the color of a solution of the dyestuff in concentrated sulfuric acid before and after the addition of paraformaldehyde, and in some cases by the shade of the dyeings given on fibers of polyacrylonitrile.

*Table*

| Example No. | 1-amino-4-hydroxy-anthraquinone sulfonic acid | Color of the dyestuff in concentrated sulfuric acid | | Shade of dyeing on polyacrylonitrile fibers |
|---|---|---|---|---|
| | | before addition of paraformaldehyde | after addition of paraformaldehyde | |
| 5 | 1-amino-4-hydroxy-6-chloroanthraquinone-2-sulfonic acid. | yellow | blue | |
| 6 | 1-amino-4-hydroxy-7-chloroanthraquinone-2-sulfonic acid. | ___do___ | ___do___ | |
| 7 | 1-amino-4-hydroxy-6-fluoroanthraquinone-2-sulfonic acid. | ___do___ | ___do___ | |
| 8 | Technical mixture of 1-amino-4-hydroxy-6- and -7-bromoanthraquinone-2-sulfonic acids. | ___do___ | pale blue | violet. |
| 9 | 1-amino-2-bromo-4-hydroxyanthraquinone-7-sulfonic acid. | greenish yellow. | blue | |
| 10 | 1-amino-2-bromo-4-hydroxyanthraquinone-5-sulfonic acid. | orange | ___do___ | |
| 11 | 1-amino-2-bromo-4-hydroxyanthraquinone-8-sulfonic acid. | yellowish red. | pale blue-violet. | |
| 12 | 1-amino-4-hydroxyanthraquinone-2:7-disulfonic acid. | yellow | blue | violet. |
| 13 | Technical mixture of 1-amino-4-hydroxyanthraquinone-2:5- and -2:8-disulfonic acids. | ___do___ | ___do___ | reddish violet. |
| 14 | Technical mixture of 1-amino-4-hydroxyanthraquinone-2:6- and -2:7-disulfonic acids. | ___do___ | ___do___ | violet. |

Representative examples are 12 and 13. The formulae of the thus-prepared dyestuffs are

EXAMPLE 12

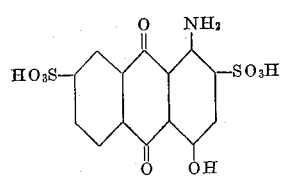

EXAMPLE 13

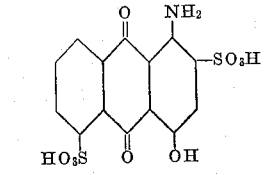

and

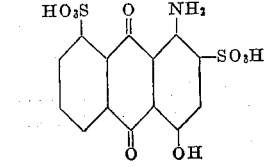

EXAMPLE 15

A dyebath is prepared from 3000 parts of water at a temperature of 20–30°, 2 parts of the dyestuff given in paragraph 1 of Example 2, 4 parts of 85% formic acid, 4 parts of copper sulfate crystals and copper foil having a surface area of 300 cm.² There is loaded into the resulting dyebath 100 parts of Orlon 42. The temperature of the bath is raised to 97–99° within 15–30 minutes, and is held at this temperature for 1–1½ hours, after which time the dyeing process has finished and the material is removed from the bath, then thoroughly rinsed and dried. Instead of copper foil, there may be added to the dyebath 1.6 parts of hydroxylammoniumsulfate. When dyeing Orlon 81, the dyebath is maintained at a temperature of 120–125° C.

Having thus disclosed the invention what is claimed is:

1. A 1-amino-4-hydroxyanthraquinone sulfonic acid which corresponds to the formula

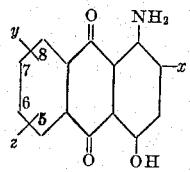

wherein $x$ stands for a member selected from the group consisting of a bromine atom and a sulfonic acid group, $y$ stands for a member selected from the group consisting of a halogen atom in one of the positions 6 and 7 and a sulfonic acid group in one of the positions 5, 6, 7 and 8, and $z$ stands—when $y$ denotes a halogen atom—for a member selected from the group consisting of a hydrogen and a halogen atom in one of the positions 7 and 6, and—when $y$ denotes a sulfonic acid group—for a hydrogen atom, at least one of $x$, $y$ and $z$ being a sulfonic acid group.

2. 1-amino-4-hydroxyanthraquinone-2,6-disulfonic acid of the formula

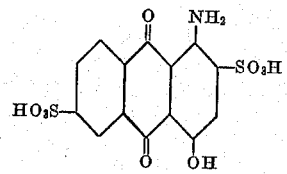

3. 1-amino-4-hydroxy-6,7-dichloroanthraquinone-2-sulfonic acid of the formula

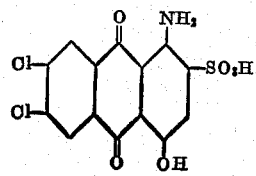

4. 1-amino-2-bromo-4-hydroxyanthraquinone-6-sulfonic acid of the formula

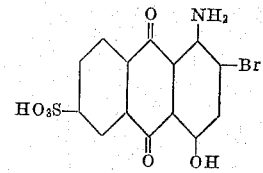

5. 1-amino-4-hydroxyanthraquinone-2,7-disulfonic acid of the formula

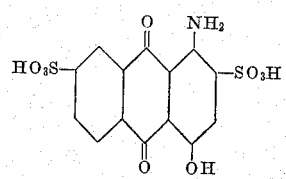

6. The technical mixture of 1-amino-4-hydroxyanthraquinone-2,5-disulfonic acid and 1-amino-4-hydroxyanthraquinone-2,8-disulfonic acid of the formulae

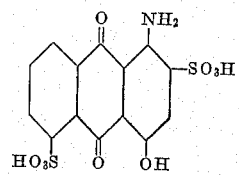

and

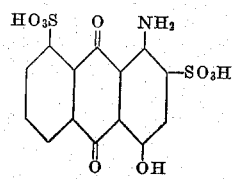

References Cited in the file of this patent

UNITED STATES PATENTS

| | | |
|---|---|---|
| 1,868,593 | Baumann | July 26, 1932 |
| 2,583,520 | Sutter et al. | Jan. 22, 1952 |
| 2,640,062 | Seymour | May 26, 1953 |

FOREIGN PATENTS

| | | |
|---|---|---|
| 657,262 | Great Britain | Sept. 12, 1951 |

UNITED STATES PATENT OFFICE
Certificate of Correction

Patent No. 2,839,540                                                                  June 17, 1958

Albin Peter et al.

It is hereby certified that error appears in the printed specification of the above numbered patent requiring correction and that the said Letters Patent should read as corrected below.

Column 2, lines 38 to 45, Example I, the formula should appear as shown below instead of as in the patent:

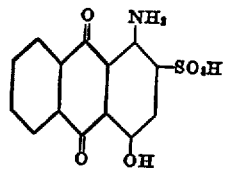

Signed and sealed this 17th day of March 1959.

[SEAL]

Attest:
KARL H. AXLINE,
*Attesting Officer.*

ROBERT C. WATSON,
*Commissioner of Patents.*